United States Patent
Pfalzgraf et al.

(10) Patent No.: US 10,262,652 B2
(45) Date of Patent: Apr. 16, 2019

(54) VOICE CONTROL METHOD AND COMPUTER PROGRAM PRODUCT FOR PERFORMING THE METHOD

(71) Applicant: SEMVOX GMBH, Saarbrücken (DE)

(72) Inventors: Alexander Pfalzgraf, Saarbrücken (DE); Norbert Pfleger, Saarbrücken (DE)

(73) Assignee: PARAGON SEMVOX GMBH, Saarbrücken (DE)

( * ) Notice: Subject to any disclaimer, the term of this patent is extended or adjusted under 35 U.S.C. 154(b) by 0 days.

(21) Appl. No.: 15/029,892

(22) PCT Filed: Oct. 16, 2014

(86) PCT No.: PCT/DE2014/100372
§ 371 (c)(1),
(2) Date: Apr. 15, 2016

(87) PCT Pub. No.: WO2015/055183
PCT Pub. Date: Apr. 23, 2015

(65) Prior Publication Data
US 2016/0232890 A1    Aug. 11, 2016

(30) Foreign Application Priority Data

Oct. 16, 2013    (DE) .......................... 10 2013 221 022
Dec. 23, 2013    (DE) .......................... 10 2013 114 763

(51) Int. Cl.
*G10L 15/01*    (2013.01)
*G10L 15/22*    (2006.01)
(Continued)

(52) U.S. Cl.
CPC .......... *G10L 15/01* (2013.01); *G10L 15/1815* (2013.01); *G10L 15/22* (2013.01); *G10L 15/26* (2013.01); *G10L 15/30* (2013.01)

(58) Field of Classification Search
CPC ....................................................... G10L 15/01
See application file for complete search history.

(56) References Cited

U.S. PATENT DOCUMENTS

6,301,560 B1 * 10/2001 Masters .................. G10L 15/19
704/251
6,324,513 B1    11/2001 Nagai et al.
(Continued)

*Primary Examiner* — Douglas Godbold
(74) *Attorney, Agent, or Firm* — Lucas & Mercanti, LLP; Klaus P. Stoffel (57) ABSTRACT

A voice control method and a computer program product, in particular for controlling a personal computer, a smartphone, an onboard computer of a vehicle, or other devices, wherein it is determined whether a control request can be determined from spoken language that is recorded by means of a recording apparatus and processed by a voice detection apparatus, wherein a voice control apparatus is operated by software, which can be changed by at least one piece of expansion software, which is provided for downloading from a server. The voice control apparatus includes an apparatus for changing the software, which, provided that it has been established that the voice control apparatus is not set up to determine and process the control request, checks if the voice control apparatus can be set up to determine and to process the control request by means of the at least one piece of expansion software.

18 Claims, 5 Drawing Sheets

(51) Int. Cl.
    *G10L 15/26*     (2006.01)
    *G10L 15/30*     (2013.01)
    *G10L 15/18*     (2013.01)

(56) References Cited

U.S. PATENT DOCUMENTS

| | | | |
|---|---|---|---|
| 6,839,669 B1* | 1/2005 | Gould | G10L 15/22 704/246 |
| 6,983,460 B1* | 1/2006 | Goire | G06F 9/445 717/175 |
| 2003/0236664 A1* | 12/2003 | Sharma | G10L 15/08 704/251 |
| 2007/0276651 A1* | 11/2007 | Bliss | G10L 15/30 704/9 |
| 2013/0117022 A1 | 5/2013 | Chen et al. | |
| 2015/0100321 A1* | 4/2015 | Papazian | G10L 15/1822 704/275 |

\* cited by examiner

VOICE CONTROL METHOD AND COMPUTER PROGRAM PRODUCT FOR PERFORMING THE METHOD

The present application is a 371 of International application PCT/DE2014/100372, filed Oct. 16, 2014, which claims priority of DE 10 2013 221 022.1, filed Oct. 16, 2013, and DE 10 2013 114 763.1, filed Dec. 23, 2013, the priority of these applications is hereby claimed and these applications are incorporated herein by reference.

BACKGROUND OF THE INVENTION

The invention relates to a voice control method, in particular for controlling a personal computer, a smartphone, an on-board computer of a vehicle or other apparatuses, in which it is determined whether a control request can be determined from spoken language recorded using a recording device and processed using a voice recognition device, a voice control device being operated using software which can be changed by means of at least one piece of expansion software which is provided for downloading from a server.

Methods of the type mentioned at the outset are known through use for controlling computers, smartphones and on-board computers of vehicles.

The aim of current developments is to make it possible to recognize the control request from freely spoken language. Whereas, when using a control device with a graphical user interface, functions which can be carried out using the control device and from which individual functions can be selected are always displayed, such a default is not supposed to exist in the voice control devices which can be operated using free language. Therefore, a large variety of functions may potentially be requested. In addition, linguistically diverse formulations are possible for the control requests.

Particularly high demands are therefore imposed on the recognition of the freely spoken language. At least one word which can be processed by the voice control device must be recognized from the spoken language, and a control request which can be processed must also be able to be assigned to the recognized word. If this is not successful, an error message is output in the known methods and it must be accepted that the linguistically requested control request cannot be performed.

Through use, it is sufficiently well known to provide an update on a server which can be connected to the voice control device for data transmission in order to update the software of the respective voice control device, for example in order to eliminate errors or to add further functions, which update can be loaded onto the voice control device.

SUMMARY OF THE INVENTION

The invention is based on the object of making it possible to adapt the voice control device to linguistically issued control requests in a need-based manner.

According to the invention, this object is achieved by virtue of the fact that the voice control device comprises a device for changing the software, which device, if it has been determined that the voice control device is not set up to determine and process the control request, checks whether the voice control device can be set up to determine and process the control request by means of the one piece of expansion software.

If it is determined that the voice control device can be set up to determine the control request by means of the expansion software, either the downloading of the expansion software and the changing of the software can be offered to a user of the voice control device or the expansion software can be both automatically loaded from the server and the software can be changed. A range of functions of the voice control device can then be expanded in a manner adapted to the control request respectively requested by means of spoken language, and the control request can be processed and possibly directly performed.

In contrast to the conventional methods in which the software is updated only in a non-specific manner with respect to the respective control request, the voice control in the method according to the invention is updated only when it is actually necessary for processing the spoken language.

Furthermore, provision may be made for only the expansion software respectively matching the control request to be loaded, with the result that the voice control device is expanded only with a function which can be used to process the linguistically requested control request. In comparison with the known general updates in which a multiplicity of changes are carried out, the set of data for transmitting the expansion software from the server to the voice control device and the loading time are kept low and the load on the data transmission networks is reduced as a result. In addition, only a comparatively small amount of additional storage space, which is required on account of the change, is used on a storage medium of the voice control device.

The voice control method according to the invention proves to be particularly advantageous if it is possible to access information which previously could not be retrieved from a computer network such as the Internet as a result of the expansion of the software. The functional diversity of the voice control method and of the apparatus respectively operated with the latter can therefore be expanded in a relatively simple manner, namely by implementing an interface to a web service, in which the information can be retrieved, and possibly rules for processing the information.

In one configuration of the invention, the change device transmits the recorded spoken language and/or a result of processing of the spoken language by means of the voice recognition device to a search device which is formed in the voice control device or/and externally on a server connected to the voice control for data transmission, and the search device determines whether the voice control device can be changed by means of the expansion software in such a manner that it can be set up to determine and process the control request.

For this purpose, the search device expediently accesses a database, which stores different expansion software which can improve the voice recognition ability of the voice control or can expand the software with different functions, and determines whether the database comprises at least one piece of expansion software which can be used to set up the voice control device to determine and possibly perform the control request.

Additional expansion software which can be used to expand the functionality of the voice control device is expediently continuously recorded in the database, with the result that the search device can always be used to determine whether the voice control device can be set up to carry out the linguistically requested control request by means of the currently available expansion software.

In one configuration of the invention, at least one data record can be retrieved for each of the stored pieces of expansion software in the database, which data record contains at least one keyword or at least one combination of keywords which characterize(s) spoken control requests which can be determined and processed by means of the expansion software.

The change device expediently loads the expansion software from the server if it has been determined that the voice control device can be set up to determine and process the control request by means of the expansion software, and the expansion software changes the software after being loaded in such a manner that the control request can be determined and processed.

In one particularly preferred embodiment of the invention, the control request is performed automatically after the software has been changed, the voice interpretation device preferably determining the control request again from the recorded spoken language and/or from a result of processing of the spoken language.

If the software is changed automatically and the control request does not have to be linguistically repeated after the change, the user does not notice the change in the voice control device, in particular it does not occur to him that the control request previously could not be performed.

The voice control device expediently accesses a voice recognition device which is set up to recognize a word and/or at least one combination of a plurality of words from the spoken language.

In one configuration of the invention, if various words or various combinations are recognized, the voice recognition device respectively determines probabilities of the correctness of the recognized words and provides the words or the combination in a list in a manner organized according to probabilities.

The voice recognition device is expediently formed locally in the voice control device or/and on an external computer which is connected to the voice control device for data transmission.

If the voice recognition device is provided locally in the voice control device, there is the advantage that there is no need to set up any data transmission to the external computer. However, the external computer can be provided with a larger computing capacity than the voice control device and can access larger and possibly more up-to-date voice recognition databases and can therefore provide a qualitatively better voice recognition result.

If the voice recognition device is implemented both locally and externally, there is not necessarily any need to transmit data to the external computer for processing the control request. It is therefore independent of network access for data transmission. If network access exists, however, it is possible to resort to the often better voice recognition result of the external computer.

In another configuration of the invention, at least one of the recognized words or at least one of the recognized combinations of words, preferably the word or the combination with the greatest determined probability, is transmitted to a voice interpretation device which determines whether a control request can be determined from the word or the combination of words, which control request can be processed by the voice control device.

For this purpose, the voice interpretation device preferably comprises a semantic interpretation unit which assigns a meaning for the voice control device to the at least one recognized word using grammatical processing rules and converts the word or the combination into an item of machine-readable information, and a context-based interpretation unit which determines whether the assigned meaning can be specified further as a function of a control request which has already been previously given and possibly already processed and/or as a function of others relating to the voice control device or the apparatus controlled using the voice control device and also determines whether the voice control device can process the machine-readable information forming the control request.

In order to determine whether a piece of expansion software suitable for processing the linguistically requested control request is present, the search device uses a comparison device to compare whether the keyword or the keyword combination is present in the recognized word or word combination. If various pieces of expansion software are suitable, the search device chooses that piece which has the greatest match for downloading or provides the user with various pieces of expansion software with a great match for downloading.

In another configuration of the invention, the search device, in addition or as an alternative to said comparison device, is also set up for voice interpretation, in particular for semantic and/or context-based voice interpretation, in the same manner as that described above for the voice control device, so that it can process the spoken language and/or the result of processing of the spoken language, which has been transmitted from the voice control, for the purpose of searching in said database.

The search device may also comprise its own voice recognition device or may access a voice recognition device which is external to the server of the search device. This is necessary for the case in which the voice recognition of the voice control device does not recognize the spoken language and no voice recognition is available on the external computer because it is not provided or cannot be achieved.

In one configuration of the invention, the expansion software comprises at least one expansion module for changing different components of the voice control. The expansion modules are preferably set up to change the voice recognition device, voice recognition rules preferably being changed.

The expansion module may also be set up to change the voice interpretation device, a dialog manager which forms a linguistic user interface between a user of the voice control device and the voice control device, a voice output device which is used to transmit information from the linguistic user interface to the user, and/or a graphical user interface for operating the voice control device, processing rules of the respective devices preferably being changed.

In another embodiment of the invention, the expansion module comprises a definition of an interface or an implementation of the interface to said information which can be retrieved via the Internet and rules for processing the information.

In one configuration of the invention, the expansion software is provided in such a manner that it also comprises an expansion module which can be used to change apparatus software of the apparatus which is used to control the voice control device. If the control request cannot be performed because the apparatus is not set up to do so, the apparatus itself can be provided with an additional function which allows the control request to be performed.

The invention also relates to a voice control apparatus, in particular for controlling a personal computer, a smartphone, an on-board computer of a vehicle or other apparatuses, which comprises the voice control device which is mentioned at the outset and is set up to determine whether a control request can be determined from spoken language recorded using a recording device and processed by means of a voice recognition device and can be operated using software which can be changed by means of at least one piece of expansion software which can be retrieved from a server by downloading. The voice control apparatus is characterized in that the voice control device comprises the device for changing the software mentioned at the outset, and the change device is provided for the purpose of checking, if it is determined that the voice control device is not set up to determine and process the control request, whether the voice control device can be set up to determine and process the control request by means of the expansion software.

In one embodiment of the invention, the apparatus forms a client in a client/server system.

In one configuration of the invention, the search device mentioned at the outset is formed on a server connected to the voice control device for data transmission, in particular a server of the client/server system.

The above-mentioned database which can be accessed by the search device and stores the different expansion software is expediently formed on the server.

In one embodiment of the invention, said voice recognition device is formed locally in the voice control device and/or externally on the server provided for data transmission with the voice control device.

In another configuration of the invention, the voice recognition device and possibly the search device have the above-mentioned voice interpretation device which comprises the above-mentioned semantic interpretation unit. The voice interpretation device and possibly the search device preferably additionally comprise the context-based interpretation unit mentioned at the outset.

In one configuration of the invention, the search device also comprises the above-mentioned comparison device.

The recording device, the voice recognition device, the change device, the search device, the voice interpretation device, the semantic interpretation unit, the context-based interpretation unit and the comparison device are each provided for the purpose of carrying out the method steps respectively described above.

The apparatus may have a hardware component or a plurality of hardware components forming one or more of the above-mentioned devices.

In the preferred embodiment of the invention, the apparatus is embedded in a device or a system which is intended to be controlled using the apparatus. The apparatus may therefore be embedded, for example, in a personal computer, a smartphone or an on-board computer of a vehicle or another apparatus comprising a computer. It would also be conceivable to form the apparatus by means of one or more hardware components which is/are provided in addition to a device which is to be controlled by means of the apparatus. The respective hardware component should be configured to be able to be connected to the apparatus to be controlled, for example via a radio connection, for example WLAN, or a serial interface such as USB.

In one embodiment of the invention, the voice control device, which can optionally comprise the local voice recognizer and possibly the recording device, forms a client which forms the apparatus.

In one configuration of the invention, the apparatus also comprises the server on which the search device and optionally also the server voice recognizer are formed. The apparatus may optionally likewise comprise the external voice recognition computer.

The invention also relates to a computer program product which can be directly loaded into the internal memory of a digital computer and has a software module for voice control, which can be used to operate a voice control device, and a software module for determining a control request, which can be used to determine whether a control request can be determined from spoken language recorded using a recording device and processed using voice recognition software, the voice control software module being able to be changed by means of at least one piece of expansion software which can be retrieved for downloading from a server. According to the invention, the computer program product comprises a software module for changing the voice control software module, and the change software module is provided for the purpose of checking, if it is determined that the voice control software module is not set up to determine and process the control request, whether the voice control software module can be set up to determine and process the control request by means of the expansion software.

The computer program product expediently comprises software sections which are used to carry out the above-described method steps of the voice control method if the computer program product runs on a computer.

The method of operation and advantages of the computer program product emerge from the explanations given above with respect to the voice control method and the voice control apparatus.

The computer program product is preferably a computer program which is stored on a computer-readable data storage medium, preferably RAM, ROM, CD, DVD or the like, or on a device comprising a computer, in particular a personal computer, a smartphone, an on-board computer of a vehicle or another apparatus which can be controlled by means of voice, or a signal sequence which represents data and is suitable for transmission via a computer network, in particular the Internet.

The computer program product can also be formed by a network of computer-implemented computer programs, for example in a client/server system or a cloud computing system.

In one configuration of the invention, the change software module is provided for the purpose of transmitting the spoken language and/or a result of processing of the spoken language by means of the voice recognition software module to a search software module which is formed in the voice control software module or is externally stored on a server connected to the voice control software module for data transmission, and the search software module is provided for the purpose of determining whether the voice control software module can be changed by means of the expansion software in such a manner that it can be set up to determine and process the control request.

The search software module is expediently provided for the purpose of accessing a database which stores different expansion software which can be used to improve or/and expand the voice recognition ability of the voice control module and is provided for the purpose of determining whether the database comprises at least one piece of expansion software which can be used to set up the voice control software module to determine and process the control request.

In one embodiment of the invention, the change software module is provided for the purpose of loading the expansion software from the server if it has been determined that the voice control software module can be set up to determine and process the control request by means of the expansion software, and the voice control software module can be changed by means of the expansion software in such a manner that it is set up to determine and perform the control request.

In another configuration of the invention, the control request determined from the recorded language can be processed by the voice control software changed by means of the expansion software. Automatic processing of the control request is preferably provided after the software has been changed. The voice recognition software module is expediently provided for being stored locally in the voice control software module and/or externally on a server which can be accessed by the voice control software module for data transmission.

In one embodiment of the invention, the voice recognition software module and possibly the search software module comprises a voice interpretation software module having a semantic interpretation software module which is set up to convert the at least one recognized word into an item of machine-readable information which forms the control request.

The voice interpretation software module and possibly the search software module additionally preferably comprises a context-based interpretation software module which is provided for the purpose of determining whether the voice software module is set up to process the machine-readable control request.

In one configuration of the invention, the computer program product comprises the expansion software which comprises various expansion modules for changing different components of the voice control software module, the expansion modules preferably being provided for the purpose of changing the voice recognition software module, the voice interpretation software module, a dialog manager which forms a linguistic user interface between a user of the computer program product and the computer program product, a voice output device which is used to transmit information from the linguistic user interface to the user, and/or a graphical user interface for operating the computer on which the computer program product is executed.

The expansion software expediently comprises various expansion modules for changing different components of the voice control software module, the expansion modules preferably being provided for the purpose of changing the voice recognition software module, the voice interpretation software module, a dialog manager which forms a linguistic user interface between a user of the computer program product and the computer program product, a voice output device which is used to transmit information from the linguistic user interface to the user, and/or a graphical user interface for operating the computer on which the computer program product is executed.

The invention is explained in more detail below using exemplary embodiments and the accompanying drawings which relate to the exemplary embodiments and in which:

DETAILED DESCRIPTION OF THE INVENTION

Figure 1:
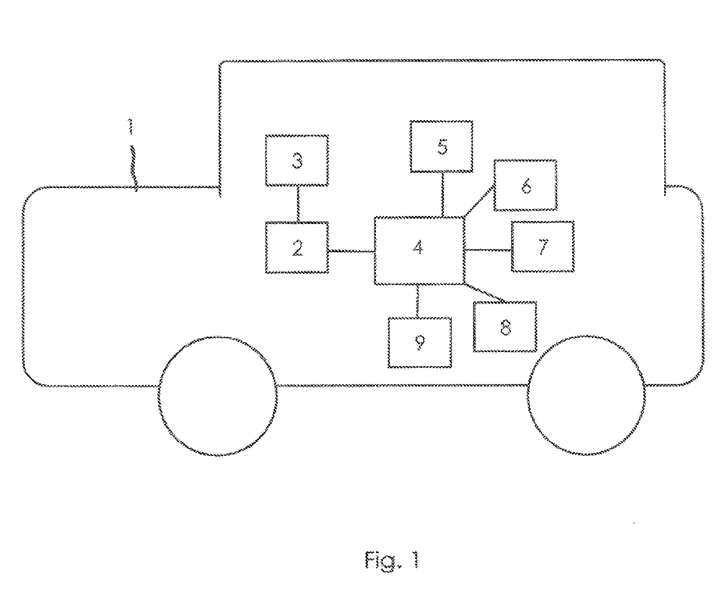
FIG. 1 schematically shows voice control according to the invention which is used in a vehicle.

A vehicle illustrated in FIG. 1 has a voice control device 2 which is connected to a recording device 3 comprising a microphone and is set up to control a local computer 4 of the vehicle 1. The local computer 4 is connected to a GPS receiver 6, a mobile telephone 7, an audio/video system 8 and further vehicle electronics 9, which can provide information relating to the vehicle speed, temperature, fuel level and the like, and is set up to transmit data to the Internet or to receive data from the latter via a radio connection.

Figure 2:
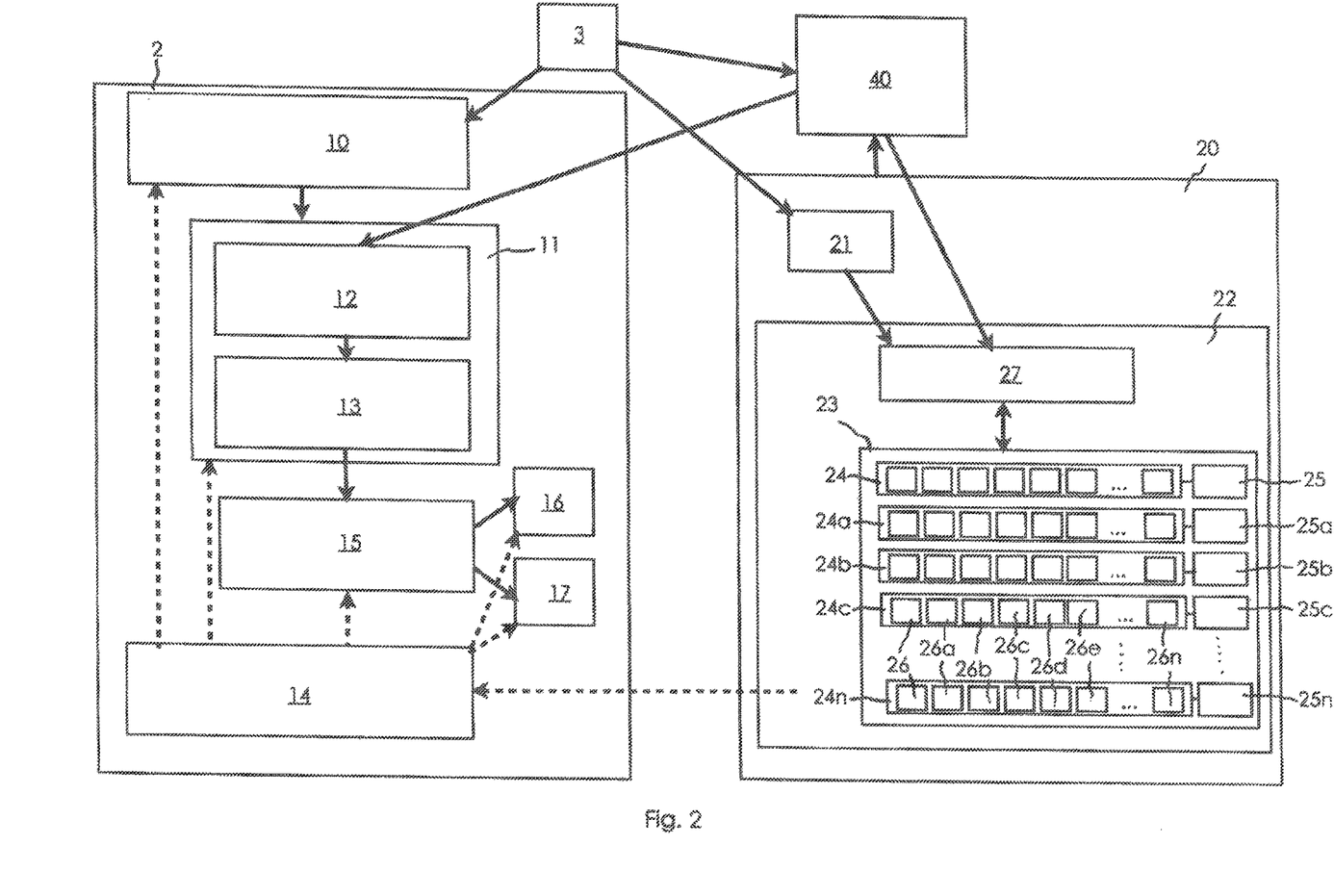
FIG. 2 shows a diagram explaining the method of operation of the voice control.

The voice control device 2 schematically illustrated in FIG. 2 comprises a computer, into the internal memory of which software is loaded, said software comprising software sections which a local voice recognizer 10, a voice interpretation device 11 which has a semantic interpretation device 12 and a context-based interpretation device 13, a change device 14 and a dialog manager 15 which an interface between the voice control 2, a voice output device 16 and a graphical user interface 17 which forms a touch-screen for displaying and operating the voice control device 2.

The voice recognizer 10, the voice interpretation device 11 and possibly also the semantic interpretation device 12, the context-based interpretation device 13, the change device 14 and/or the dialog manager 15 may alternatively be formed in individual hardware components.

The voice control device 2 can be connected to a server 20 via a data connection, for example via the Internet, into the internal memory of which server software is loaded, said software comprising software sections which are used to form a separate server voice recognizer 21 and a search device 22 comprising a comparison device 27 which can access a database 23 which is created on the server 20 and stores various expansion software packages 24 to 24n and data records 25 to 25n which characterize the expansion software 24 to 24n. Each of the data records 25 to 25n comprises at least one keyword or at least one combination of a plurality of keywords belonging to control requests which can be performed by installing the respective expansion software package 24 to 24n. The voice control device 2 can also optionally be connected to an external voice recognition computer 40 via a data connection.

The expansion software packages 24 to 24n are provided for the purpose of providing the voice control device 2 and the local computer 4 with additional functions. For this purpose, they comprise n+1 different expansion modules 26 to 26n which are provided for the purpose of changing the voice recognizer 10, the voice interpretation device 11, the dialog manager 15 as well as the voice output device 16 and the user interface 17.

Figure 3:
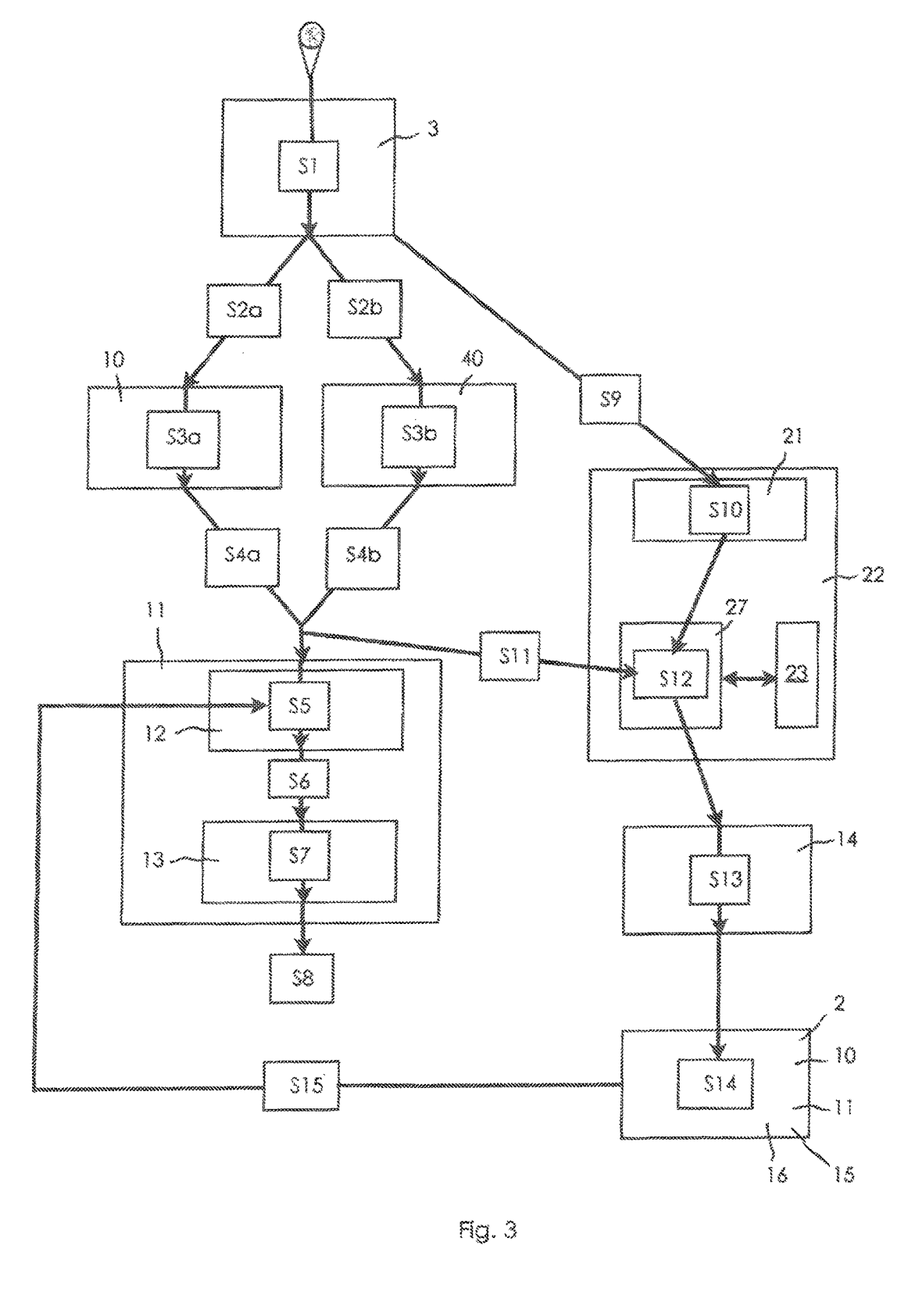
FIG. 3 shows a further diagram explaining the method of operation of the voice control.

As schematically illustrated in FIG. 3, a control request spoken into a microphone is converted into digital audio data by the recording device 3 in a method step S1 during operation of the voice control device 2. The audio data are transmitted to the voice recognition device 10 of the voice control 2 (method step S2a) and optionally to the external voice recognition computer 40 at the same time (method step S2b).

The local voice recognizer 10 and possibly the external voice recognition computer 40 determine individual words and possibly word combinations from the audio data. If different words or word combinations are determined, respective probabilities are determined therefor (method steps S3a and S3b) and the words or word combinations are forwarded, with the respective largest determined probabilities, to the voice interpretation device 11 (method steps S4a and S4b).

In the semantic voice interpretation device 12, the words or word combinations are converted into an item of machine-processable information (method step S5) and are forwarded to the context-based interpretation device 13 in method step S6.

In method step S7, the context-based interpretation device 13 determines whether the machine-readable control request can be performed. If this is possible, the control device performs the control request directly (method step S8). If the performance cannot yet be processed solely by means of the machine-processed information from the semantic voice interpretation device 12, the context-based interpretation device 13 checks whether missing information or information sources which can be accessed by the context-based interpretation device, for example previously processed control requests or state data relating to the GPS receiver 6, the mobile telephone 7, the audio/video system 8 or the vehicle electronics 9, can be obtained in order to perform the control request and performs the machine-readable control request on the basis of this information. It is also possible for the voice control device 2 to obtain the missing information via the dialog manager 15. If the missing information is then available, the control request is performed (method step S8).

If, in contrast, it is determined in the above-mentioned method steps that neither the local voice recognizer 10 nor the external voice recognition computer 40 can recognize words or word combinations from the spoken language, the audio data are transmitted to the search device 22 (method step S9) which determines the words or word combinations using its own voice recognizer 21 and forwards them to the comparison device 27 (method step S10).

If the semantic voice interpretation device 12 cannot convert the words or word combinations into a machine-processable control request or if the context-based interpretation device 13 determines that the machine-processable control request cannot be performed, the data which represent the spoken language and have previously been determined using the local voice recognizer 10 or the external voice recognition computer 40 are directly transmitted to the comparison device 27 (method step S11).

The comparison device 27 checks whether the database 23 contains an expansion software package 24 to 24n which can be used to change the voice control device 2 in such a manner that the control request issued using the spoken language can be performed.

For this purpose, the comparison device 26 checks whether the keyword(s) is/are contained in the word or word combination recognized from the spoken language (method step S12).

If only a single such expansion software package 24 to 24n is available, the change device 14 loads the expansion software package 24 to 24n onto the computer of the voice control 2 (method step S13). If a plurality of such expansion software packages 24 to 24n are found, either that package whose keywords have the greatest match to the spoken control request is directly loaded or the expansion of the software packages 24 to 24n, possibly with an indication of properties, expansion software packages 24 to 24n, such as price, range of functions or manufacturer, is offered to the user for selection.

With installation of the expansion software package 24 to 24n, the change device 14 changes the software of the computer of the voice control device 2 and in the process adapts the voice recognition device 10, the voice interpretation device 11, the dialog manager 15 as well as the voice output device 16 and the user interface 17 (method step S14).

In this case, an interface for making contact with an information service on the Internet can be implemented in the software and the software can be updated in such a manner that it can process the newly retrievable information.

It is also conceivable for the change device 14 to also carry out software updates in the local computer 4 of the vehicle 1 or the vehicle electronics 9.

After the voice control device 2 has been successfully updated, the audio data are supplied to the local voice recognizer 10 again (method step S15). The control request can be performed by carrying out method steps S3a to S8 described above.

Individual ones of the method steps mentioned above are explained in more detail below using specific linguistic control requests.

User B says: "Where can I go to eat something Italian in the vicinity?"

After carrying out method steps S1, S2a and S2b, the local voice recognizer 10 does not provide any result and the external voice recognition computer 40 determines the word sequence "Where can I eat something in the vicinity".

The semantic interpretation device 12 does not provide any result since no interpretation rules matching the word sequence are available.

The word sequence "Where can I eat something in the vicinity" determined using the external voice recognition computer 40 is then directly transmitted to the search device 22 (method step S11).

The search device 22 checks whether the individual words in the word sequence are present in the keyword combinations in the data records 25 to 25n of the expansion software packages 24 to 24n (method step S12) and causes an expansion software package 24 to 24n which has the greatest match to the request to be downloaded to the control device 2 (method step S14). The change device 14 installs the expansion software package 24 to 24n, in which case interfaces for accessing an information service on the Internet, which has information relating to restaurants and the like, are installed.

The audio data generated after method step S1 are then processed further by the control device 2 again according to method steps S5 to S8 and the control request is therefore performed, for example by virtue of the users being informed of restaurants by means of the dialog manager 15, be it via the voice output device 16 or via the graphical user interface 17.

Figure 4:
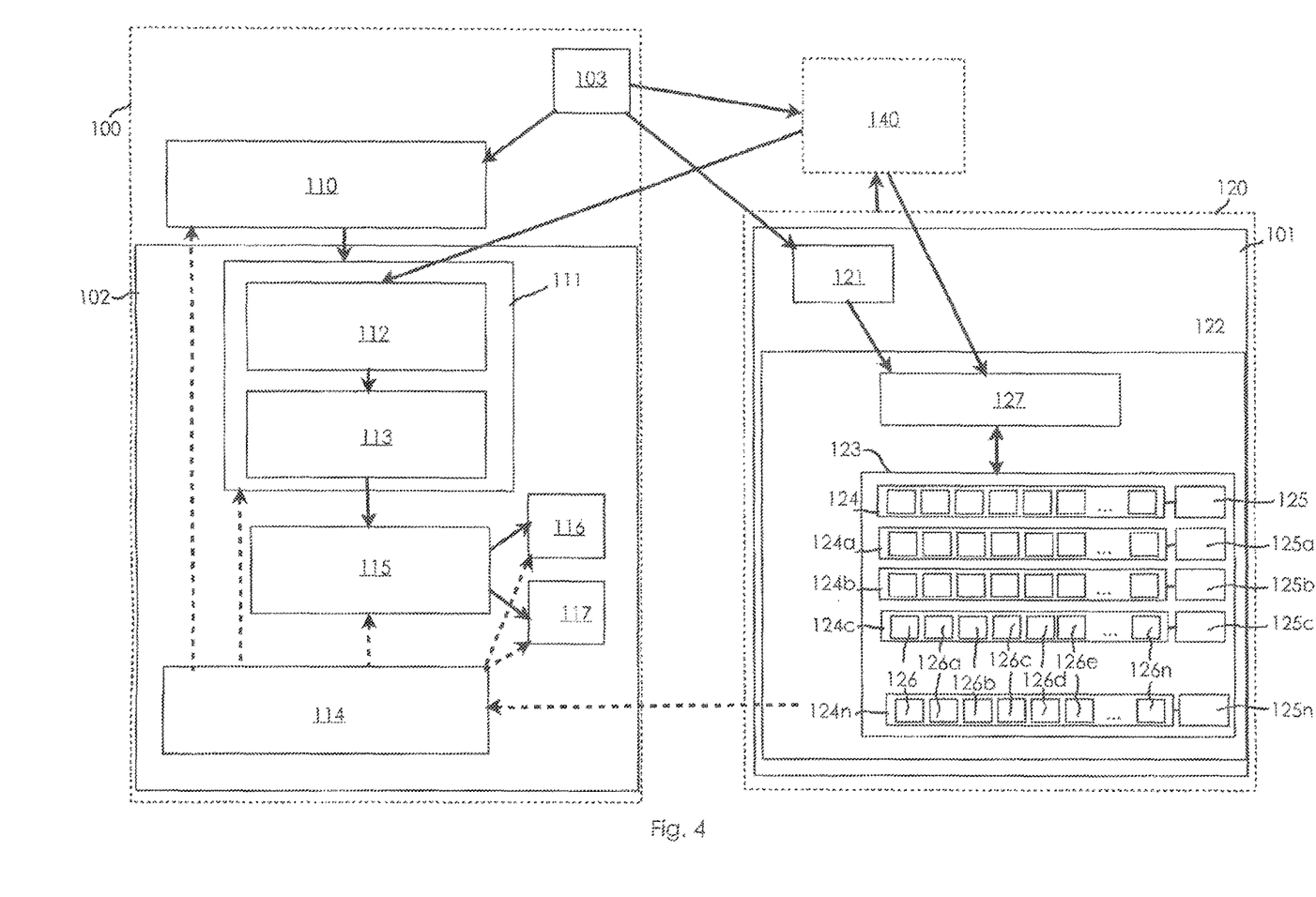
FIG. 4 shows a diagram of the method of operation of further voice control.

FIG. 4 schematically illustrates the structure of a computer program product according to the invention which comprises a computer program which can be used to carry out the method described above when the computer program runs on a computer.

The computer program is explained below using use in a smartphone 100, on the computer of which the computer program is stored. It goes without saying that the computer program can be used for various other apparatuses which can be controlled using spoken language.

Upon activation of the computer program, control requests for using the smartphone 100 can be recorded and stored using a recording device 103 of the smartphone 100, which is conventionally used when making a telephone call, and a microphone as well as a computer program for converting sound into audio data is suitable and using a voice recognition program 110 of the smartphone 100.

The computer program comprises a software module 102 for determining a control request from spoken language recorded using the microphone of the smartphone and processed using the voice recognition program 110. The computer program also comprises a voice interpretation software module 111, which has a semantic interpretation software module 112 and a context-based interpretation software module 113, a change software module 114 and a dialog manager software module 115 which forms an interface to a voice output device 116, which comprises a loudspeaker of the smartphone, and a graphical user interface 117 for operating the smartphone which comprises a touchscreen of the smartphone.

The voice control software module 102 can be connected, directly or via the Internet, to an external voice recognition computer 140, on which voice recognition software runs, and to a server 120. The smartphone then acts as the client in a client/server system formed with the server 120.

A server computer program 101 is loaded into an internal memory of the server 129, which server computer program is part of the computer program product and comprises its own server voice recognition module 121 and a search software module 122 having a comparison software module 127 which can access a database 123 which is created on the server 120 and stores various expansion software packages 124 to 124n and data records 125 to 125n which characterize the expansion software 124 to 124n. Each of the data records 125 to 125n comprises at least one keyword or at least one combination of a plurality of keywords belonging to control requests which can be performed by installing the respective expansion software package 124 to 124n. The database 123, the expansion software packages 124 to 124n and/or the data records 125 to 125n may likewise parts of the computer program product.

The expansion software packages 124 to 124n are provided for the purpose of providing the voice control software modules 102 and possibly the smartphone with additional functions. For this purpose, they comprise n+1 different expansion modules 126 to 126n which are provided for the purpose of changing the voice recognizer 10, the voice interpretation device 11, the dialog manager software module 115 as well as the voice output device 116 and the user interface 117.

Figure 5:
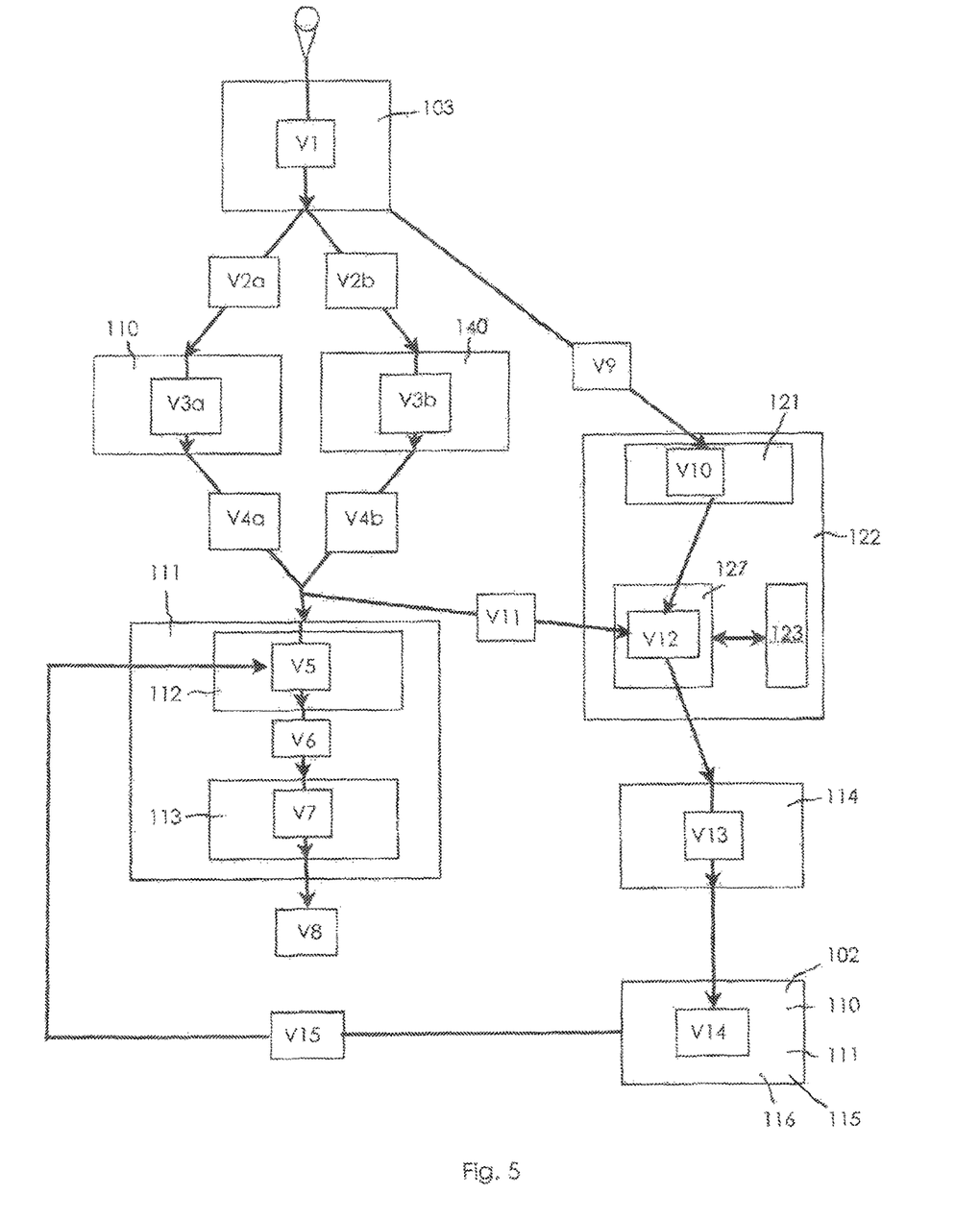
FIG. 5 shows a diagram for explaining the control according to FIG. 4.

FIG. 5 schematically shows the method of operation of the computer program product according to the invention in the smartphone 100, the voice recognition computer 140 and the server 120.

In a first method step V1, a control request spoken into the microphone of the smartphone is converted into digital audio data by means of the recording device 103. The audio data are transmitted to the voice recognition program 110 (method step V2a) and optionally to the external voice recognition computer 140 at the same time (method step V2b).

The voice recognition program 110 and possibly the external voice recognition computer 140 determine individual words and possibly word combinations from the audio data. If different words or word combinations are determined, respective probabilities are determined therefor (method steps V3a and V3b) and the words or word combinations are forwarded, with the respective largest determined probabilities, to the voice interpretation module 111 (method steps V4a and V4b).

In the semantic voice interpretation software module 112, the words or word combinations are converted into an item of machine-processable information (method step V5) and are forwarded to the context-based interpretation software module 113 in method step V6.

In method step V7, the context-based interpretation software module 113 determines whether the machine-readable control request can be performed. If this is possible, the computer program performs the control request directly (method step V8). If the performance cannot yet be processed solely by means of the machine-processed information from the semantic voice interpretation software module 112, the context-based interpretation software module 113 checks whether missing information or information sources which can be accessed by the context-based interpretation software module 113, for example previously processed control requests or state data relating to a GPS receiver of the smartphone 100, can be obtained in order to perform the control request and performs the machine-readable control request on the basis of this information. It is also possible for the voice control software module 102 to obtain the missing information via the dialog manager 15. If the missing information is then available, the control request is performed (method step V8).

If, in contrast, it is determined in the above-mentioned method steps that neither the voice recognition software 110 nor the external voice recognition computer 140 can recognize words or word combinations from the spoken language, the audio data are transmitted to the search software module 122 (method step V9) which determines the words or word combinations using its own voice recognition module 121 and forwards them to the comparison software module 127 (method step V10).

If the semantic voice interpretation software module 112 cannot convert the words or word combinations into a machine-processable control request or if the context-based interpretation software module 113 determines that the machine-processable control request cannot be performed, the data which represent the spoken language and have previously been determined using the voice recognition program 110 or the external voice recognition computer 140 are directly transmitted to the comparison software module 127 (method step V11).

The comparison software module 127 checks whether the database 123 contains an expansion software package 124 to 124n which can be used to change the voice control software module 102 in such a manner that the control request issued using the spoken language can be performed.

For this purpose, the comparison software module 126 checks whether the keyword(s) is/are contained in the word or word combination recognized from the spoken language (method step V12).

If only a single such expansion software package 124 to 124n is available, the change software module 114 loads the expansion software package 124 to 124n onto the computer of the smartphone (method step V13). If a plurality of such expansion software packages 124 to 124n are found, either that package whose keywords have the greatest match to the spoken control request is directly loaded or the expansion of the software packages 124 to 124n, possibly with an indication of properties, expansion software packages 124 to 124n, such as price, range of functions or manufacturer, is offered to the user for selection.

With installation of the expansion software package 124 to 124n, the change software module 114 changes the software of the computer of the smartphone and in the process adapts voice recognition software module 110, the voice interpretation software module 111, the dialog manager 115 as well as the interface of the voice output device 116 and the user interface 17 (method step V14).

In this case, an interface for making contact with an information service on the Internet can be implemented in the computer program and the computer program can be updated in such a manner that it can process the newly retrievable information.

It is also conceivable for the change software module 114 to also carry out software updates on further software of the smartphone.

After the voice control module 102 has been successfully updated, the audio data are supplied to the voice recognition program 110 again (method step V15). The control request can be performed by carrying out method steps V3a to V8 described above.

A further exemplary embodiment (not shown here using drawings) differs from that according to FIGS. 4 and 5 in that the search software module, including the comparison software module, is formed on the smartphone 100 instead of on the server 120 and the comparison software module accesses the database 123 formed on the server 120 from the smartphone in order to determine whether suitable expansion software can be retrieved.

The invention claimed is:

1. A voice control method for controlling a personal computer, a smartphone, an on-board computer of a vehicle or other apparatuses, comprising the steps of: ascertaining whether a control request is determinable from spoken language recorded using a recording device and processed using a voice recognition device; and operating a voice control device using software which can be changed by at least one piece of expansion software which is provided for downloading from a server, wherein the voice control device comprises a change device for changing the software, which change device, if it has been determined that the voice control device is not set up to determine and process the control request, checks whether the voice control device can be set up to determine and process the control request by the expansion software, wherein the software is modified by the expansion software so that the software permits access to previously unobtainable information suitable for setting the device up to determine and process the control request from the Internet, wherein the expansion software implements in the software a new interface for making contact with an information service on the Internet from which the previously unobtainable information is retrievable, wherein the expansion software implements new rules for processing the previously unobtainable and newly retrievable information.

2. The method as claimed in claim 1, wherein the change device transmits the spoken language and/or a result of processing of the spoken language by the voice recognition device to a search device which is formed in the voice control device or externally on a server connected to the voice control device for data transmission, and the search device determines whether the voice control device is changeable by the expansion software so that the voice control device can be set up to determine and process the control request.

3. The method as claimed in claim 2, wherein the search device accesses a database, which is formed on the server connected to the voice control device for data transmission and stores different expansion software which can improve the voice recognition ability of the voice control device or/and can expand the software, and determines whether the database comprises at least one piece of expansion software that is usable to set up the voice control device to determine and process the control request.

4. The method as claimed in claim 2, wherein the voice recognition device and optionally the search device comprise a voice interpretation device having a semantic interpretation unit which converts at least one recognized word into an item of machine-readable information which forms the control request, the voice interpretation device and optionally the search device additionally comprising a context-based interpretation unit which determines whether the voice control device is set up to process the machine-readable control request.

5. The method as claimed in claim 4, wherein the expansion software comprises various expansion modules for changing different components of the voice control device, wherein the expansion modules change the voice recognition device, the voice interpretation device, a dialog manager which forms a linguistic user interface between a user of the voice control device and the voice control device, a voice output device which is used to transmit information from the linguistic user interface to the user, and a graphical user interface for operating the voice control device.

6. The method as claimed in claim 2, wherein the search device comprises a comparison device that compares a result of processing of the spoken language by the voice recognition device with a data record that characterizes the expansion software and comprises at least one keyword, the comparison device checking whether the keyword or a plurality of keywords is/are contained in words determined when processing the spoken language.

7. The method as claimed in claim 1, wherein the change device loads the expansion software from the server if it has been determined that the voice control device is capable of being set up to determine and process the control request by the expansion software, and the expansion software then changes the software so that the voice control device is set up to determine and perform the control request.

8. The method as claimed in claim 7, wherein the control request determined using recorded language is processed by the voice control device changed by the expansion software, and the control request is automatically processed after the software has been changed.

9. The method as claimed in claim 1, wherein said voice recognition device is formed locally in the voice control device and/or externally on a server connected to the voice control device for data transmission.

10. The method according to claim 1, wherein the expansion software sets the software up to change processing rules of the voice control device.

11. The method according to claim 1, wherein the expansion software sets the software up to change processing rules of a dialogue manager that forms a linguistic user interface between the user of the voice control device and the voice control device, a voice output device used to transmit information from the linguistic user interface to the user, and/or a graphical user interface for operating the voice control device, so that the previously unobtainable and newly retrievable information can be processed by the voice control device.

12. A voice control apparatus, comprising: a recording device; a voice recognition device; and a voice control device that includes a software module for voice control that operates the voice control device, the voice recognition device being operative to determine whether a control request is determinable from spoken language recorded using the recording device and processed using voice recognition software, the voice control software module being changeable by at least one piece of expansion software that is retrievable for downloading from a server, the voice control device including a change device having a change software module for changing the voice control software module, the change software module being operative to check, when it is determined that the voice control software module is not set up to determine and process the control request, whether the voice control software module is capable of being set up to determine and process the control request by the expansion software, wherein the change device modifies the software by the expansion software so that the software permits access to previously unobtainable information from the Internet, while the expansion software implements in the software a new interface for making contact with an information service on the Internet from which the previously unobtainable information is obtainable, wherein the expansion software is provided for implementing new rules for processing the previously unobtainable and newly retrievable information.

13. The voice control apparatus as claimed in claim 12, wherein the change software module is provided for transmitting the spoken language and/or a result of processing of the spoken language by the voice recognition software module to a search software module that is formed in the voice control software module or is externally stored on a server connected to the voice control software module for data transmission, and the search software module is provided for determining whether the voice control software module is capable of being changed by the expansion software so that the voice control software module can be set up to determine and process the control request.

14. The voice control apparatus as claimed in claim 13, wherein the search software module is provided for accessing a database that stores different expansion software for improving or/and expanding voice recognition ability of the voice control software module and is provided for determining whether the database comprises at least one piece of expansion software usable to set up the voice control software module to determine and process the control request.

15. The voice control apparatus as claimed in claim 12, wherein the change software module is provided for loading the expansion software from the server when it has been determined that the voice control software module is capable of being set up to determine and process the control request by the expansion software, and the voice control software module is changeable by the expansion software so that the voice control software module is set up to determine and perform the control request.

16. The method according to claim 12, wherein the expansion software sets the software up to change processing rules of the voice control device.

17. The method according to claim 12, wherein the expansion software sets the software up to change processing rules of a dialogue manager that forms a linguistic user interface between the user of the voice control device and the voice control device, a voice output device used to transmit information from the linguistic user interface to the user, and/or a graphical user interface for operating the voice control device, so that the previously unobtainable and newly retrievable information can be processed by the voice control device.

18. A voice control method for controlling and on-board computer of a vehicle using a voice control device that is connected to a recording device comprising a microphone and is set up to control the on-board computer of the vehicle, comprising the steps of: ascertaining whether a control request is determinable from spoken language recorded using a recording device and processed using a voice recognition device; and operating a voice control device using software which can be changed by at least one piece of expansion software which is provided for downloading from a server, wherein the voice control device comprises a change device for changing the software, which change device, if it has been determined that the voice control device is not set up to determine and process the control request, checks whether the voice control device can be set up to determine and process the control request by the expansion software, wherein the software is modified by the expansion software so that the software permits access to previously unobtainable information suitable for setting the device up to determine and process the control request from the Internet, wherein the expansion software implements in the software a new interface for making contact with an information service on the Internet from which the previously unobtainable information is obtainable, wherein the expansion software implements in the software new rules for processing the previously unobtainable and newly retrievable information and carries out software updates in the on-board computer of the vehicle or vehicle electronics for processing the previously unobtainable in newly retrievable information.

* * * * *